United States Patent Office 3,318,774
Patented May 9, 1967

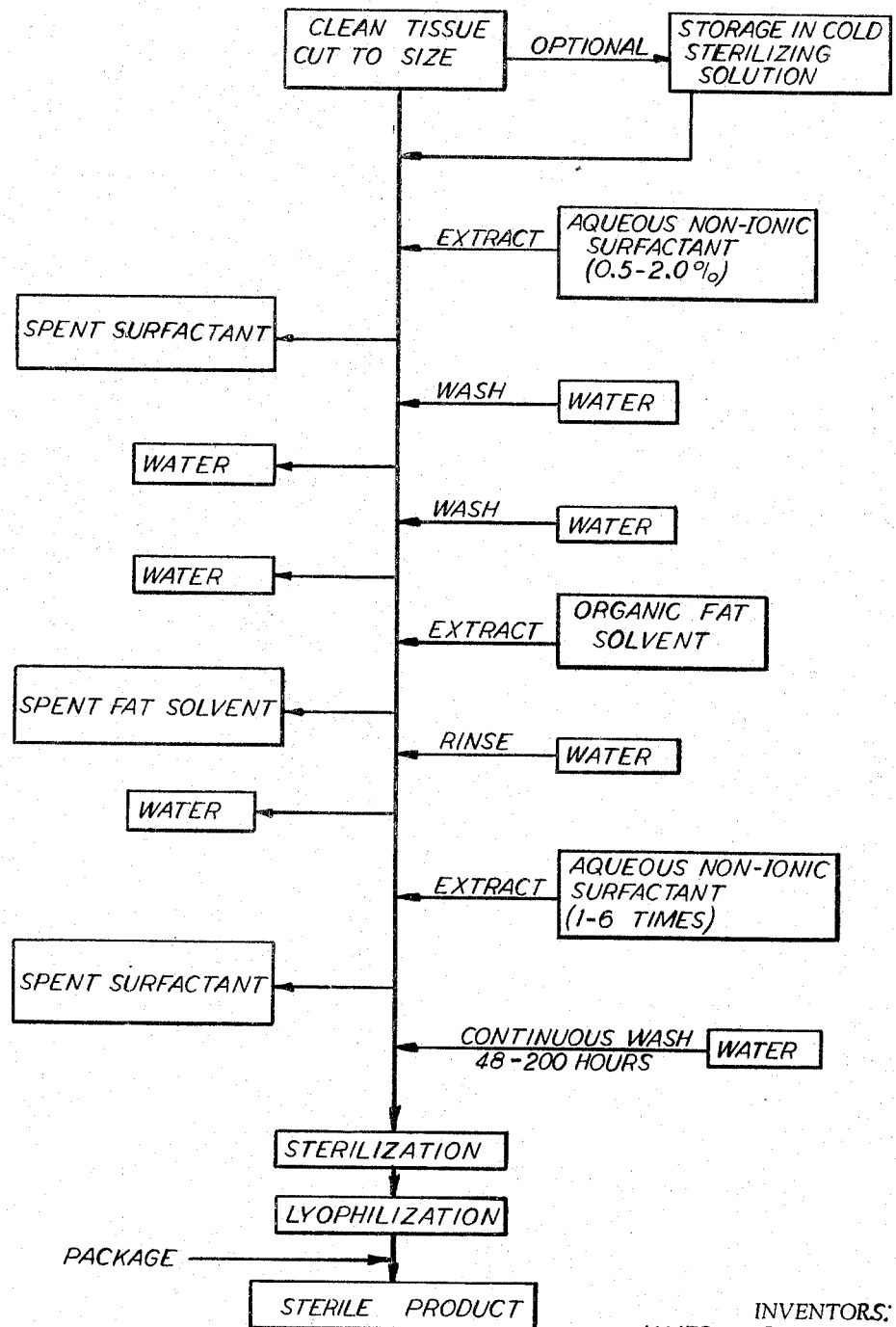

3,318,774
TREATMENT OF OSSEOUS AND OTHER TISSUE
James Alexander Dingwall, New York, N.Y., and Wayne L. Westcott, Nixon, N.J., assignors, by mesne assignments, to E. R. Squibb & Sons, Inc., New York, N.Y., a corporation of Delaware
Filed June 22, 1965, Ser. No. 466,015
28 Claims. (Cl. 167—74)

This application is a continuation-in-part of our co-pending application Ser. No. 391,996, filed Aug. 25, 1964, which is a continuation-in-part of application Ser. No. 166,925, filed Jan. 17, 1962, which in turn is a continuation-in-part of application Ser. No. 95,811, filed Mar. 15, 1961, all of which are now abandoned.

This invention relates to the treatment of animal tissue for surgical purposes. More particularly, the invention relates to the processing of collagen-containing tissue including bone, cartilage, tendon or fascia and the processed tissue obtained thereby for use in grafting or implantation.

The method of this invention may be applied to collagenous, substantially non-vascularized, non-adipose tissue of both the hard and soft variety, i.e., bone, cartilage, tendon or fascia, derived from any animal source, particularly bovine, porcine, ovine, equine and canine sources. This may include warm blooded mammals such as cattle, hogs, sheep, horses, dogs and the like. Large animals such as calves are a particularly desirable source of bone or cartilage which are the preferred tissues for application of this invention, but especially bone.

The animal part or tissue may be varied in size or shape according to the purpose for which it will be used. For example, cortical calf bone may be cut into pieces of different size. Cancellous bone may be cut into pieces or ground to appropriate particle size. Ribs, being a cortico-cancellous type of bone, are particularly suitable when cut to appropriate sizes. Calf embryo bone or cartilage may be used in the form of orbits, mandibles, nasal septa, nasal cartilage or skull for maxillofacial surgery and rhinology. The products obtained according to this invention are well tolerated by the recipient in which they have been introduced as a surgical graft or implant.

Briefly this invention contemplates the following procedure as outlined in the accompanying figure. The bone or other tissues are first removed from the animal under sanitary conditions. All adhering extraneous tissue is removed under sterile conditions. Then, in accordance with the process of this invention, the material is extracted by washing with an aqueous solution containing a non-ionic surfactant or dispersing agent in order to remove serum proteins. Upon completion of this washing, the material is then extracted with an organic fat solvent to remove the fats still present. After adequate treatment with the organic fat solvent, the material is again washed with an aqueous solution containing a non-ionic surfactant or dispersing agent as above. The treated material is then thoroughly washed with water for a sufficient period of time for removal of all treating agents and residual water soluble substances. The water washed tissue may then be sterilized. The bone or other tissue processed in this manner may be stored for extended periods for later surgical use. Preferably the material is freeze dried under sterile conditions prior to storage. If the excised tissue is to be stored prior to extraction with the surfactant solution, it is desirable to keep the material in a liquid sterilizing medium.

In a more comprehensive embodiment, the bone or other tissue is first excised from the animal body under sanitary conditions. Then the material is thoroughly cleaned of all extraneous adhering tissue and, if desired, rinsed with sterile dilute sodium chloride solution or other balanced salt solution such as Earl's balanced salt solution, Tyrode's solution or the like. The tissue is cut into various sizes and shapes for surgical purposes. For example, cortical bones may be cut into different sizes. Cancellous slabs may be obtained from the epiphysis of long bones. The remainder may be cut into cubes which are then ground.

The material may, if desired, be stored in a liquid sterilizing medium prior to the first extraction. This optional, preliminary step permits accumulation of a batch for processing and in addition serves to leach out some serum proteins. In this operation the animal tissue is placed in sterile containers which are filled with sterile solution containing a biologically useful sterilizing agent, e.g., lactones or alcohols, such as β-propiolactone, glycidol, propylene glycol, cyclic oxides, e.g., alkylene oxides such as ethylene oxide, propylene oxide, aldehydes such as formaldehyde and the like, the parabens, etc. A sterile salt solution of about 0.5 to 5% concentration is preferred. The containers should be large enough to hold 5 to 15 volumes of saline solution. The containers are then sealed and stored in the cold, e.g., at a temperature of about 0 to 10° C. for a period of up to about 30 days. About 0.5 to 2.0% of sterilizing agent may be used.

After preliminary storing in the sterilizing solution, the bone or other tissue is extracted with an aqueous solution containing about 0.5 to 2.0% of non-ionic surfactant or dispersing agent, preferably one which has biological acceptance, i.e., a water dispersible or water miscible surface active agent which is effective in removing proteins and other water soluble materials and leaves no toxic or antigenic residue. Examples of surfactants or dispersing agents are the complex ester and ester-ether types such as partial esters of higher unsaturated fatty acids with anhydrides of polyhydroxy alcohols and polyoxyethylene derivatives thereof, e.g., Spans and Tweens (see Merck Index, 7th edition, 1960, page 970). Polysorbate 80 [polyoxyethylene (20) sorbitan monooleate] is preferred. The bone or other material is washed with about 5 to about 15 volumes of the above aqueous solution per unit weight of solid. The extraction is continued for about 20 to 30 hours at about room temperature, preferably under constant agitation. The surfactant solution is then removed and the animal material is rinsed with water.

This followed by extraction with an organic fat solvent which is effective in removing fatty components without altering the collagen, mineral or complex polysaccharide contents and leaves no toxic or antigenic residue upon further processing. This includes, for example, hydrocarbons, e.g., lower aliphatic hydrocarbons, such as hexane, halogenated hydrocarbons such as chloroform, methylene chloride, ethers, e.g., dialkyl ethers such as diethyl ether alcohols, e.g., lower aliphatic alcohols such as methanol, ketones, e.g., dialkylketones such as acetone, mixtures thereof or the like. About 5 to 15 volumes are used. This extraction procedure is carried out for about 20 to 30 hours at ambient temperature. From one to six separate extractions, each with fresh solvent, may be used.

Following the final extraction with the fat solvent, the solvent is removed, the bone or other tissue is rinsed with water and then extracted with a non-ionic surfactant or dispersing agent of the type referred to above. In this step, it is important to use a continuously changing solution, or if the extraction is carried out in a batch operation, at least two separate extractions using fresh material for each extraction must be used. The same volumes and concentrations of the solutions as described previously are employed.

Finally the surfactant solution is removed and the bone or other material is washed continuously with changing water for a period of about 48 to 200 hours at ambient temperature.

The processed material is then in condition for sterilization. This may be effected by subjecting the processed material to a volatilizable liquid sterilizing agent of the group referred to prevously, a gaseous sterilizing agent such as alkylene oxides like ethylene oxide, propylene oxide, aldehydes, e.g., vaporized formaldehyde or the like, irradiation, e.g., cathode irradiation, gamma ray irradiation, etc. Preferred is aqueous β-propiolactone solution of about 1 to 1.5% for about 48 to 72 hours at or below room temperature, e.g., about 0 to +5° C. When a liquid agent is used, the sterilizing solution is then removed and the tissue may be rinsed with sterile water.

It is preferable at this point to dry the sterilized tissue so that it may be safely stored until required by a method not involving the application of heat, e.g., freeze drying or vacuum drying or in a current of sterile, moving, dry air. Freeze drying may be effected by placing the sterilized tissue in sterile, covered trays, freezing for a period of about 12 to 48 hours at a product temperature of about —20° to —80° C., then drying under vacuum, e.g., at about 50 mm. or less, for a period of about 24 to 240 hours at a product temperature up to about +30° C. The freeze dried material may then be sealed in sterile containers for storage.

Certain conditions within the ranges specified render optimum results from the point of view of quality of product and convenience in manufacture. Insofar as possible, especially in the case of the surfactants and washing medium, it is desirable to use physiologically acceptable materials. These conditions constitute the preferred mode of operation.

In the preliminary storage solution, a minimum of 10 volumes per weight of bone is preferred. Storage is for 5 to 30 days or more at 4 to 5° C. Preferred conditions for subsequent operations include 1% polysorbate 80 solution, for each of the surfactant washing steps, chloroform-methanol, 2:1 by volume, for fat extraction, and 1% concentration of β-propiolactone solution at room temperature for 48 hours for sterilization. About 10 volumes of solution per unit weight of bone or other tissue should be used in each washing or extraction step of the process.

While the process has been described above as an essentially batch procedure, it is of course readily apparent that continuous processing may be utilized.

It has been found that the sequence of operations described above must be followed in the order set forth for proper results to be obtained. For example, it is important to remove the serum proteins with surfactant solution prior to fat extraction in order to avoid denaturing of the former so that they become more insoluble. Extraction of the fat, followed by secondary extraction with the surfactant or dispersing agent and water wash, in this sequence, best accomplishes the removal of the fat, serum proteins and the treating agents.

The process described, utilizing the sequence of operations in the proper order, yields a heterogenous product for implantation from which the serum proteins, red cells, fats and other sources of antigenicity have been substantially removed. The collagen or connective tissue and minerals (hydroxyapatite crystals) in bone, which are not responsible for antigenic reaction, are left substantially unaffected. Trace minerals are also unaffected. Mucopolysaccharides are still present. The residual water content of processed tissue is in the range of about 0.5 to 8% (by weight).

Cartilage or tendon obtained by the process of this invention consists essentially of collagen, mucopolysaccharides and water. Bone consists essentially of collagen, hydroxyapatite crystals, mucopolysaccharides and water. Fascia consists essentially of ground substance, fibers, mucopolysaccharides and water. Trace minerals are, of course, still present in each instance.

In other words a heterogeneous tissue for implantation is obtained comprising (1) an organic matrix consisting essentially of high molecular weight protein with a very large content of hydroxy-proline and deficient in sulfur containing amino acids and tryptophan, said organic matrix having a normal fiber orientation and periodicty, substantially free of cellular elements and reaction-inducing serum proteins including lipo-protein, α-, β- and γ-globulins, isoagglutinins, albumin, coagulation components, hormones, enzymes, hypertensins, neutral fats, phospholipids, glycerides, fatty acids, cholesterol, and other dissolved substances, in (2) a gel of highly polymerized carbohydrates consisting essentially of hexosamines, uronic acids, hexoses and containing sulfate and phosphate and (3) water, having a content of homologous serum less than 50 mg./15 gm. of tissue whereby antigenic factors are reduced below levels eliciting an immune response. In addition, bone also has (4) a mineral fraction comprising calcium phosphate, calcium carbonate, calcium fluoride, calcium hydroxide, calcium citrate, magnesium and sodium in a crystalline form belonging to the group of hydroxyapatites.

This product, unlike anorganic bone, for example, is not completely inert but stimulates the host to revascularize the area and to resorb the implant by normal bone growth mechanisms without antigenic reactions until it is eventually completely replaced by new, host tissue, in the exact host image.

Examination of the tissue under the electron microscope shows that it has essentially the normal collagen periodicity, that is, the normal fiber orientation and banding is essentially undisturbed and the period has values ranging from about 400 to 1000 A., with an average of about 640 A. [Bourne, The Biochemistry and Physiology of Bone (Academic Press, New York) 1956, page 112]. The normal collagen-mineral ratio is also maintained. Cortical bone retains its normal strength.

The antigenicity of the processed material is removed or, at the least, reduced below a level which elicits an antigenic response in the host. When tested by the guinea pig anaphylaxis test, the homologous serum content of the tissue is reduced to less than 50 mg./15 gm. of tissue and is usually less than 5 mg./15 gm. of tissue. At this level, the red cell antigens are not demonstrable. In the anaphylaxis test, guinea pigs are injected intraperitoneally with 0.75 mg. to 10 mg. of processed tissue suspended in Freund's complete adjuvant and the animal is challenged 10 to 14 days subsequently by an intravenous injection of 1 ml. of 1% aqueous homologous serum.

The detection of circulating antibodies by passive cutaneous anaphylaxis, hemagglutination reaction and gel-diffusion techniques confirm the removal or reduction of antigenic factors below levels eliciting an immune response.

Thus no evidencce of systemic immunization or sensitization is observed. No local immune reactions are obtained even after second and third implantations.

The following examples are illustrative of the invention.

*Example 1*

Selected calves, weighing from 175 to 225 lbs., of a large bone type (Holstein), are washed down prior to slaughter. Immediately after slaughter, the forelegs are removed at the articulating point (including all tissues and hide). The hooves are removed and the calf legs scrubbed, clipped, rinsed, and placed in tubs containing sufficient Wescodyne solution (polyethoxy polypropoxy ethanol-iodine complex, nonylphenyl ether of polyethylene glycol-iodine complex) to cover the legs and then passed into a sterile operating room. Standard aseptic operating room techniques are used in the excision of the bone.

The bones are thoroughly cleaned of extraneous material. The cleaned bones are separated into cancellous and cortical type by cutting with a slow speed sterile band saw. Cancellous slabs are cut from the epiphyseal area of the bone approximately 3" x ½" x ¼" in size. The remainder is cut into cubes ½" to 1" in size then ground in a sterile mill and the chips are collected in a sterile container.

The cortical shafts are halved, the bone marrow removed and the halves of the cortical bone are rinsed with sterile 0.85% aqueous sodium chloride. They are then cut into ½" to ⅝" widths. The cortical pieces are cleaned of cancellous bone. From four legs 5" cortical bones, ten 3" cortical bones, twenty 3" cancellous slabs and 2000 grams of ground cancellous bone are obtained.

The cortical bones are placed (according to length) in sterile containers which are then completely filled with sterile solution containing 0.85% sodium chloride, 1.68% sodium bicarbonate, 1% β-propiolactone, sealed and stored at 5° C. for 30 days. The cancellous slabs are similarly placed in separate sterile containers, filled with the sterilizing solution, sealed and stored at 5° C. for 30 days.

All the above bone is then placed in baskets and introduced into vessels containing 10 volume/weights of 1% aqueous polysorbate 80 solution made up in distilled water. Constant agitation is maintained for 24 hours at room temperature. The polysorbate 80 solution is removed and the bone is rinsed with three separate 10 volume charges of distilled water. To the vessel is then added 10 volume/weights of 2:1 chloroform-methanol solution. The bone is agitated in the organic solvent for 24 hours at room temperature.

The chloroform-methanol solution is removed and the bone is rinsed with three separate 10 volume charges of distilled water. To the container is then added 10 volume/weights of a 1% aqueous polysorbate 80 solution. The bone is agitated in the polysorbate 80 solution for 24 hours at room temperature. The solution is removed, the same amount of fresh polysorbate 80 solution is added and the washing is repeated for the same length of time.

The polysorbate 80 solution is removed and the bone is washed with flowing, filtered, deionized water for 120 hours at room temperature.

The processed bone is then sterilized by submersing in 10 volume/weights of a 1% β-propiolactone solution made up as follows:

| | |
|---|---|
| Sodium chloride | gms 8.5 |
| Sodium bicarbonate | gms 16.8 |
| Sterile water for injection chilled to 5° C. | ml 990 |
| β-Propiolactone added after solution of the salts | ml 10 |

The container with the bone and sterilizing solution is sealed and held at room temperature for 48 hours after which it is removed.

The sterilized bone is drained, rinsed with sterile, distilled water, placed in sterile covered trays and frozen for 12 hours at −40° C. The frozen bone is dried under vacuum of 50 microns for 24 hours at −20° C. The tray temperature is then elevated to room temperature.

The vacuum is broken with sterile, filtered nitrogen, the trays are removed and the bone is then aseptically transferred to sterile containers which are stoppered under a minimum vacuum of 150 mm.

Example 2

Fetal calves approximately three-months old are secured during slaughtering operations in intact placentas. Each intact sac is placed in a suitable container washed with water, covered with Wescodyne sterilizing solution and passed into the sterile operating room. The placenta is cut, the fetus removed and the embryo bone and cartilage excised from the head area by standard aseptic operating techniques.

The entire skull plate, two small orbits and 32 orbit chips are removed. All tissue and tooth buds are removed from the mandible. Each ramus of the mandible is cut in quarters. The nasal cartilage is cut into squares of approximately ½". All the bone and cartilage is rinsed with sterile 0.85% saline solution and each type of tissue is placed in a separate container filled with sterilizing solution (about 10 volumes of solution per weight of bone), sealed and stored at 5° C. for 30 days.

The embryo bone and cartilage is then processed with the same sequence of steps as described in Example 1. The processed embryo bone and cartilage is sterilized and lyophilized in the same manner as described in Example 1. The material is then aseptically transferred to sterile containers and stoppered under a minimum vacuum of 150 mm.

What is claimed is:

1. A process for the treatment of bone for implantation which comprises the sequential steps of (1) extracting the bone with a dilute aqueous, non-ionic biologically acceptable surfactant solution which removes the serum proteins without leaving an antigenic residue upon further processing, (2) extracting with an organic fat solvent which removes the fats without leaving an antigenic residue upon further processing, (3) extracting at least twice with fresh surfactant solution, (4) washing with water for at least about 48 hours and drying the bone without applying heat.

2. A process as in claim 1 wherein the fat solvent is selected from the group consisting of aliphatic hydrocarbons, halogenated hydrocarbons, ethers, alcohols, ketones and mixtures thereof.

3. A process as in claim 1 wherein the surfactant is polyoxyethylene (20) sorbitan monooleate.

4. A process which comprises in sequence (1) excising animal bone under sanitary conditions, (2) soaking said bone in a biologically useful sterilizing solution, (3) extracting the bone with aqueous biologically acceptable surfactant solution containing about 0.5 to 2.0% of partial ester of higher unsaturated fatty acid with anhydride of polyhydroxy alcohol surfactant, (4) extracting the bone with alcoholic solution for about 20 to 30 hours, (5) extracting said bone with fresh aqueous surfactant solution, (6) washing said bone with continuously changing water for about 48 to 200 hours and (7) sterilizing the washed bone without applying heat.

5. A process for the treatment of cartilage for implantation which comprises the sequential steps of (1) extracting the cartilage with a dilute aqueous, non-ionic biologically acceptable surfactant solution which removes the serum proteins without leaving an antigenic residue upon further processing, (2) extracting with an organic fat solvent which removes the fats without leaving an antigenic residue upon further processing, (3) extracting at least twice with fresh surfactant solution, (4) washing with water for at least about 48 hours and drying the cartilage without applying heat.

6. A process as in claim 5 wherein the fat solvent is selected from the group consisting of aliphatic hydrocarbons, halogenated hydrocarbons, ethers, alcohols, ketones and mixtures thereof.

7. A process as in claim 5 wherein the surfactant is polyoxyethylene (20) sorbitan monooleate.

8. A process for the treatment of tendon for implantation which comprises the sequential steps of (1) extracting the tendon with a dilute aqueous, non-ionic biologically acceptable surfactant solution which removes the serum proteins without leaving an antigenic residue upon further processing, (2) extracting with an organic fat solvent which removes the fats without leaving an antigenic residue upon further processing, (3) extracting at least twice with fresh surfactant solution, (4) washing with water for at least about 48 hours and drying the tendon without applying heat.

9. A process as in claim 8 wherein the fat solvent is selected from the group consisting of aliphatic hydrocarbons, halogenated hydrocarbons, ethers, alcohols, ketones and mixtures thereof.

10. A process as in claim 8 wherein the surfactant is polyoxyethylene (20) sorbitan monooleate.

11. A process for the treatment of fascia for implantation which comprises the sequential steps of (1) extracting the fascia with a dilute aqueous, non-ionic biologically acceptable surfactant solution which removes the serum proteins without leaving an antigenic residue upon further processing, (2) extracting with an organic fat solvent which removes the fats without leaving an antigenic residue upon further processing, (3) extracting at least twice with fresh surfactant solution, (4) washing with water for at least about 48 hours and drying the fascia without applying heat.

12. A process as in claim 11 wherein the fat solvent is selected from the group consisting of aliphatic hydrocarbons, halogenated hydrocarbons, ethers, alcohols, ketones and mixtures thereof.

13. A process as in claim 11 wherein the surfactant is polyoxyethylene (20) sorbitan monooleate.

14. A process for the treatment of bone for implantation which comprises in sequence (1) extracting the bone with aqueous surfactant solution containing about 0.5 to 2.0% of a surfactant of the group consisting of partial ester of higher unsaturated fatty acid with anhydride of polyhydroxy alcohol and polyoxyethylene derivatives thereof, (2) extracting said bone with an organic fat solvent selected from the group consisting of lower aliphatic hydrocarbons, halogenated hydrocarbons, lower aliphatic alcohols, ethers, ketones and mixtures thereof, (3) extracting said bone with fresh aqueous surfactant solution as previously defined, (4) washing said bone with changing water for about 48 to 200 hours, (5) sterilizing the washed bone by means of a sterilant of the group consisting of lower aliphatic alcohols, parabens, lactones, alkylene oxides, aldehydes and irradiation, and (6) freeze drying said bone.

15. A process as in claim 14 wherein the bone is extracted at least twice with surfactant solution in the inertial extraction.

16. A process as in claim 14 wherein the surfactant is polyoxyethylene (20) sorbitan monooleate.

17. A process for the treatment of calf bone which comprises in sequence (1) extracting said bone with about 5 to 15 volumes of about 1% polyoxyethylene (20) sorbitan monooleate solution for over 20 hours at about room temperature, (2) extracting said bone with about 5 to 15 volumes of chloroform-methanol solution in a proportion of about 2:1 by volume at about room temperature, (3) extracting said bone with about 1% polyoxyethylene (20) sorbitan monooleate, (4) washing said bone with at least two changes of water for at least 48 hours, (5) sterilizing the washed bone with about 1% propiolactone solution and (6) drying said bone for over 12 hours at about −20° to +30° C.

18. A process which comprises in sequence (1) excising calf bone under sanitary conditions, (2) soaking said bone in about 1 to 1.5% aqueous β-propiolactone solution in excess of 48 hours at about 0° to 5° C., (3) extracting the bone with about 1% polyoxyethylene (20) sorbitan monooleate solution, (4) extracting said bone with chloroform-methanol solution in a proportion of about 2:1 by volume, (5) extracting said bone with about 1% polyoxyethylene (20) sorbitan monooleate solution, (6) washing said bone with continuously changing water for at least 48 hours, (7) sterilizing the washed bone with about 1% β-propiolactone solution and (8) freeze drying said bone for over 12 hours at about −20° to +30° C.

19. A process which comprises in sequence (1) excising calf cartilage under sanitary conditions, (2) soaking said cartilage in about 1 to 1.5% aqueous β-propiolactone solution in excess of 48 hours at about 0° to 5° C., (3) extracting the cartilage with about 1% polyoxyethylene (20) sorbitan monooleate solution, (4) extracting said cartilage with chloroform-methanol solution in a proportion of about 2:1 by volume, (5) extracting said cartilage with about 1% polyoxyethylene (20) sorbitan monooleate solution, (6) washing said cartilage with continuously charging water for at least 48 hours, (7) sterilizing the washed cartilage with 1% β-propiolactone solution and (8) freeze drying said cartilage for over 12 hours at about −20° to +30° C.

20. Heterogenous bone for implantation consisting essentially of collagen, hydroxyapatite crystals, mucopolysaccharides and water, having essentially normal collagen periodicity in the range of about 400 to 1000 A, substantially free of serum protein and fats and having a content of homologous serum less than 50 mg. per 15 gm. of bone when tested by the guinea pig anaphylaxis test.

21. Heterogenous bone as in claim 20 wherein the content of homologous serum is less than 5 mg. per 15 gm.

22. Heterogenous cartilage for implantation consisting essentially of collagen, mucopolysaccharides and water, having essentially normal collagan periodicity in the range of about 400 to 1000 A, substantially free of serum protein and fats having a content of homologous serum less than 50 mg. per 15 gm. of said tissue when tested by the guinea pig anaphylaxis test.

23. Heterogenous cartilage as in claim 22 wherein the content of homologous serum is less than 5 mg. per 15 gm.

24. Heterogenous fascia for implantation consisting essentially of ground substance, fibers, mucopolysaccharides and water, substantially free of serum protein and fats and having a content of homologous serum less than 50 mg. per 15 gm. of said tissue when tested by the guinea pig anaphylaxis test.

25. Heterogenous fascia as in claim 24 wherein the content of homologous serum is less than 5 mg. per 15 gm.

26. Heterogenous tendon for implantation consisting essentially of ground substance, fibers, mucopolysaccharides and water, substantially free or serum protein and fats and having a content of homologous serum less than 50 mg. per 15 gm. of said tissue when tested by the guinea pig anaphylaxis test.

27. Heterogenous tendon as in claim 26 wherein the content of homologous serum is less than 5 mg. per 15 gm.

28. Heterogenous bone as in claim 20 wherein the bone is calf bone.

No references cited.

ALBERT T. MEYERS, *Primary Examiner.*

LEROY B. RANDALL, *Assistant Examiner.*